3,449,478
METHOD OF SLIP CASTING BASIC
REFRACTORY MATERIALS
George R. Henry, Bethel Park, and Robert K. Scott, Pittsburgh, Pa., assignors to Dresser Industries, Inc., Dallas, Tex., a corporation of Delaware
No Drawing. Filed Mar. 30, 1966, Ser. No. 538,596
Int. Cl. B28b 1/26
U.S. Cl. 264—86                               7 Claims

ABSTRACT OF THE DISCLOSURE

A method of slip casting basic refractory shapes from size graded batches tempered with an aqueous tempering agent including from about 0.2 to 5% finely divided flowers of sulfur and a small but effective amount of hydrated lime which extends the working time of the batch.

---

This invention is directly related to and an improvement over United States Patent No. 3,189,668, assigned to the same assignee.

The use of casting techniques and, particularly, slip casting, for making thick-walled refractory shapes from certain chemically basic refractory materials has been fraught with difficulty. In order to slip cast a chemically basic refractory material such as dead burned magnesite (more aptly termed dead burned magnesia in that its main constituent is MgO), to obtain a self-sustaining refractory shape, preferably having high density and low porosity it is necessary to size grade the material so a considerable portion thereof is in the fine fraction of the batch. However, fine dead burned magnesia (—65 or —325 mesh) is extremely susceptible to hydration.

Another basic raw material that is being used in increasing amounts is fused magnesite-chrome ore grain. The same problems often are encountered when attempting to cast this grain. This susceptibility to hydration upon exposure to the atmosphere tends to cause cracking, bloating, and swelling of cast shapes particularly when an aqueous tempering media (the preferred tempering media for slip casting) is employed. This tendency to hydrate is particularly distressing with high-purity dead burned synthetic magnesia which is available today. When we say "high purity" in this case, we mean a dead burned magnesia containing about 90% or more MgO, by weight on the basis of an oxide analysis.

United States Patent No. 3,189,668, referred to above, discloses that flowers of sulfur additions can prevent cracking, bloating, and swelling during drying of basic materials when cast in an aqueous media. However, it is necessary to cast almost immediately after mixing, because the batch tends to gel or stiffen within 5 to 10 minutes after mixing. Some batches have actually gelled in the mixer.

Accordingly, it is an object of this invention to provide a novel process of casting refractory shapes from chemically basic refractory grain, the major portion of which is MgO, by weight, on an oxide basis.

It is another object of this invention to provide a method of slip casting thick-walled refractory shapes from chemically basic refractory materials, which method provides ample time between mixing and casting. By "thick-walled," we mean greater than 1/4" thickness.

Briefly, according to one aspect of the invention, chemically basic refractory grain is size graded, slip cast, dried, and fired to obtain a ceramically bonded, high purity, basic shape. The grain is sized so that about 50 to 65% is —4+28 mesh, the remainder passing a 28 mesh screen. About 30 to 35% of the grain is —65 mesh, and the average particle diameter of the —65 mesh fraction is, preferably, on the order of 2 to 3 microns. From about 0.2 to 5% and, preferably, 0.2 to 2%, by weight, of finely divided flowers of sulfur and from about 0.1 to 1% and preferably about 0.2% hydrated lime containing material, based on the weight of the dry size graded magnesite, is intimately admixed with said magnesite. The time of completion of mixing is visually determined by an operator, but experience has shown that 5 to 10 minutes is adequate in such as a muller-type mixer.

A suitable tempering fluid is prepared and mixed with the dry ingredients (the size graded basic grain, sulfur, and the hydrated lime) for about 5 to 10 minutes, and then poured into a mold. A preferred tempering fluid is comprised of 4 to 7% of water, about 0.5% of a dispersant. Suitable dispersants are sodium pyrophosphate, Darvan #7 (a proprietary product sold by R. T. Vanderbuilt Company, New York, N.Y.), etc. We prefer a plaster mold, but other types of water-absorbent materials can be used; for example, paper or cardboard. It is essential, however, that the material be water-absorbent, in order to prevent surface entrapment of gas bubbles about the cast shape. Such bubbles are undesirable, because they result in surface imperfections in the subsequent fired shape. The mold usually is subjected to vibration during pouring of the tempered mixture. Without vibration, we find it very difficult to cause the mixture to completely fill a porous mold.

The material is left in the mold to set. Set time is variable, but is easily determined by an operator. In our own work, when an exposed surface of the cast material resists light pressing of the finger without deformation, then we consider the shape to be set and proceed to strip the mold therefrom. The resulting shape should then be dried. It may be air-dried or placed in a drier which is heated to a temperature between 200 and 250° F. The drying is generally continued until the shape has constant weight. By constant weight, we mean no further volatiles are driven off at the low drying temperatures we suggest.

The dried shapes are placed in a kiln and fired to a temperature between 2500 and 3000° F., preferably between 2700 and 2900° F. for the high-purity magnesites, and magnesite chrome grain we have mentioned above.

The following examples are given by way of explanation and not by way of limitation, in order to more fully describe the invention to those skilled in the art.

Example I

Example I was made according to United States Patent No. 3,189,668, referred to above. It was necessary to immediately transfer the tempered batch from the mixer to the plaster molds. Even so, a certain amount of stiffening occurred during the casting. However, a suitable shape was prepared.

A fused magnesite-chrome grain was size graded so that 60% was —4+28 mesh and 40% was —28 mesh. About 30% of the magnesite passed a 65 mesh screen, and had an average particle diameter (as determined by the air permeability method) on the order of 2.5 microns.

About 0.2% of finely divided flowers of sulfur was intimately admixed with the sized magnesite. The sulfur particle size is submicron. It was technical grade and can be purchased as an article of commerce.

We separately prepared a tempering fluid. It was comprised of 4.25 parts of water per 100 parts of the dry solids, and .5 part of Darvan #7 per 100 parts of the dry solids. The tempering fluid ingredients were intimately admixed with the dry solids consisting of the sized magnesite and sulfur. A plaster mold was prepared and the liquid and solids mixture poured into the mold until it was filled. After approximately 30 minutes, the cast material had solidified to such an extent that light finger pressure left no impression on an exposed area of the cast article. The mold was stripped easily, and the shape placed in a drier to dry overnight (about 12 hours) at about 250° F. After drying, the shape appeared strong, and careful visual examination could discern no cracking. The dried shape was placed in a kiln and fired to 2820° F. for 10 hours.

Example II

Many additions to the batch described in Example I were made in an attempt to prevent too rapid gelling and stiffening. It was finally found that if a small addition of lime hydrate was made to the batch it could be handled without fear of rapid setting. A mix was made identically to Example I, except that 0.2% lime hydrate was added. The mix was tempered with about 5% water and thereafter cast in a plaster mold. It was thought that 5% water was somewhat in excess of what was required but still provided a workable batch. After about 25 minutes, the mold was separated from the cast shape. The shape had excellent surfaces as it was released from the mold.

The shape was thereafter broken up and remixed. It became workable again and, after about 5 minutes mixing time, was cast into another plaster mold. The moisture content of the remixed batch was estimated about 4½%; that is, about ½% was removed by the first plaster mold. As far as we know, it has never before been possible to rework a basic casting batch. While this property is useful only where a cast shape is damaged and to be discarded, it does demonstrate the exceptional working time of batches according to our invention. Working time is the time between mixing and stiffening beyond the point where it can be cast.

Example III

It was found that the method described in Example II sometimes needed to be modified where the molds used had internal mandrels. The batch often exhibited the tendency to shrink around the mandrel before it had set sufficiently to remove the mandrel easily. It was found, however, that a small addition of bentonite or equivalent to the batch would correct this. The bentonite addition may range from about 0.1 to 0.5%, and is preferably about 0.2%.

Example IV

To insure that the combination of hydrated lime, bentonite, sulfur, and dispersant would be useful in the slip casting of other basic raw materials, three additional mixes were made. They were sized and prepared similarly to Example I. They contained three different dead burned magnesites as aggregate. They were found to work very well. The water addition had to be increased to about 6%, by weight, of the batch, but this is to be expected because of the lower density of the magnesite grain.

The chemical analyses of the fused grain and three dead burned magnesites used in the examples are given in the following table.

TABLE I

| | Percent | | | |
|---|---|---|---|---|
| | Fused magnesite chrome grain | Dead burned magnesite | Dead burned magnesite | Dead burned magnesite |
| $SiO_2$ | 1.3 | 2.8 | 0.7 | 0.32 |
| $Al_2O_3$ | 6.6 | 0.3 | 0.3 | |
| $FeO$ | 11.7 | | | 0.61 |
| $Cr_2O_3$ | 17.9 | | | |
| $CaO$ | 0.5 | 1.5 | 0.7 | 2.04 |
| $MgO$ | 62.1 | 94.8 | 98 | 96.83 |

It is believed that the lime-hydrate addition should be more than 0.1%, but less than about 1%. Lime and its hydrate is generally unwanted in chrome ore-containing systems because of its deleterious effect on the refractoriness of those systems. It would be permissible to use calcined and rehydrated dolomite as a source of lime hydrate in the practice of this invention.

It should be understood that various other refractory aggregates may be used in the coarser fraction (i.e., the +65 mesh fraction) of the dry mix that is used to make shapes according to the invention. For example, up to 15 or 20%, by weight, of chrome ore, dead burned dolomite, forsterite, alumina, olivine, silicon carbide, hard-burned fire clay, ganister, fused silica, etc., can be used in the +65 mesh fraction. Up to 5% or so can be in the −65 mesh fraction also, if desired.

Further, if desired, a batch composition of 60% +65 mesh chrome ore and 40% −65 mesh dead burned magnesite can be cast into shapes using this invention. Of course, the magnesite should be sized in the manner discussed above.

In summary, this invention is to an improved method of casting basic refractory shapes from aqueous batches. It has been found that the tendency of such batches to rapidly stiffen or set up can be prevented by a small hydrated lime addition. It is not known to us how the lime addition works. However, it is believed that it tends to retard the hydration of the fine fraction of the basic refractories batch.

We claim:
1. In the methods of slip casting basic refractory shapes from basic refractory materials which methods include the steps of:
    (1) preparing a size graded refractory batch having a +65 mesh and a −65 mesh fraction, the average particle diameter of the −65 mesh material being on the order of about 2 to 3 microns, all percentages being by weight,
    (2) adding from 0.2 to 5%, by weight of the refractory batch, of finely divided flowers of sulfur,
    (3) preparing from 4 to 7 parts, by weight, of aqueous tempering fluid, per 100 parts of solid batch,
    (4) intimately admixing the tempering fluid with the refractory sulfur and hydrated lime, the hydrated lime being present in an amount of 0.1 to 1 weight percent which amount is sufficient to extend the workability of the batch,
    (5) casting the tempered refractory mixture during the period of extended workability in a fluid-absorbent mold and causing the tempered refractory to fill the mold,
    (6) allowing the cast material to set,
    (7) separating the mold from the set shape, and
    (8) drying the cast shape to substantially constant weight.
2. The methods of claim 1 in which the lime hydrate is added in the form of calcined and rehydrated dolomite.
3. The method of claim 1 in which the refractory material is substantially all dead burned magnesite of at least about 90% MgO, by weight, on an oxide basis.
4. The method of claim 1 in which the refractory material is substantially all fused magnesite-chrome grain.
5. The method of claim 1 in which up to 0.5% bentonite, based on the weight of the solids, is added to the batch.
6. The method of claim 1 in which the additions are 0.5% flower of sulfur, 0.2% hydrated lime, and 0.2% bentonite.
7. The method according to claim 1 in which the sized graded refractory batch has the following sizing: 50 to 65% −4+28 mesh, 35 to 50% −28 mesh, 30 to 35% −65 mesh, the average particle diameter of the −65 mesh being on the order of about 2 to 3 microns, all percentages being by weight.

(References on following page)

References Cited

UNITED STATES PATENTS

| | | | |
|---|---|---|---|
| 2,479,504 | 8/1949 | Moore | 106—58 X |
| 3,199,995 | 8/1965 | King | 106—58 |
| 3,202,519 | 8/1965 | Scott | 106—58 X |
| 3,231,402 | 1/1966 | Leatham | 106—58 |
| 3,357,842 | 12/1967 | Bowman | 106—58 |
| 2,313,746 | 3/1943 | Heany | 25—156 |
| 2,784,085 | 3/1957 | Denning | 92—21 |
| 3,137,657 | 4/1962 | Quirk | 252—478 |
| 3,189,668 | 10/1963 | Miller | 264—56 |
| 3,250,833 | 5/1966 | Wagner | 264—43 |

OTHER REFERENCES

Brick & Clay Record, Clay modifiers, November 1958, p. 51.

ROBERT F. WHITE, *Primary Examiner.*

RICHARD R. KUCIA, *Assistant Examiner.*

U.S. Cl. X.R.

106—63